(12) United States Patent
Gupta et al.

(10) Patent No.: US 11,750,695 B1
(45) Date of Patent: Sep. 5, 2023

(54) DYNAMIC QUARANTINE OF IMPAIRED SERVERS

(71) Applicant: Amazon Technologies, Inc., Seattle, WA (US)

(72) Inventors: Diwakar Gupta, Seattle, WA (US); Jean-Paul Bauer, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 1376 days.

(21) Appl. No.: 15/823,288

(22) Filed: Nov. 27, 2017

(51) Int. Cl.
 *H04L 67/1034* (2022.01)
 *H04L 67/1008* (2022.01)
 *G06F 9/50* (2006.01)
 *H04L 43/0817* (2022.01)
 *H04L 43/062* (2022.01)

(52) U.S. Cl.
 CPC ........ *H04L 67/1034* (2013.01); *G06F 9/5077* (2013.01); *H04L 43/062* (2013.01); *H04L 43/0817* (2013.01); *H04L 67/1008* (2013.01)

(58) Field of Classification Search
 CPC ............... H04L 67/101; H04L 67/1025; H04L 67/1029; H04L 67/1034; H04L 67/1031; H04L 43/08; H04L 43/0805; H04L 43/0817
 See application file for complete search history.

(56) References Cited

U.S. PATENT DOCUMENTS

| | | | | |
|---|---|---|---|---|
| 8,805,998 | B2 * | 8/2014 | Pereira | G06F 1/32 709/224 |
| 8,949,658 | B1 * | 2/2015 | Scanlan | G06F 11/0793 714/4.2 |
| 9,367,687 | B1 * | 6/2016 | Warshenbrot | G06F 21/566 |
| 9,571,353 | B1 * | 2/2017 | Chheda | H04L 41/0604 |
| 9,886,338 | B1 * | 2/2018 | Khokhar | G06F 11/34 |
| 9,906,422 | B2 * | 2/2018 | Jalan | H04L 43/08 |
| 10,440,153 | B1 * | 10/2019 | Smith | H04L 67/34 |
| 10,505,818 | B1 * | 12/2019 | Yona | H04L 47/125 |
| 10,601,683 | B1 * | 3/2020 | Kulshreshtha | H04L 41/5019 |
| 10,929,797 | B1 * | 2/2021 | Gupta | H04L 47/728 |
| 2007/0233866 | A1 * | 10/2007 | Appleby | H04L 67/1008 709/226 |
| 2008/0209255 | A1 * | 8/2008 | Seguin | G06F 11/0748 714/E11.178 |
| 2010/0306597 | A1 * | 12/2010 | Goldszmidt | G06F 11/079 714/48 |
| 2011/0010560 | A1 * | 1/2011 | Etchegoyen | G06F 11/2025 713/189 |
| 2012/0284408 | A1 * | 11/2012 | Dutta | G06F 9/5066 709/226 |

(Continued)

*Primary Examiner* — Jerry B Dennison
(74) *Attorney, Agent, or Firm* — NICHOLSON DE VOS WEBSTER & ELLIOTT, LLP

(57) ABSTRACT

Techniques for dynamic quarantine of impaired servers are described. A host monitor can obtain first monitoring data associated with a host computing device to at least one fingerprint. A host score associated with the host computing device can be updated based at least on the at least one fingerprint, the score determining a probability of the host computing device being used for a new job. Second monitoring data associated with the host computing device can be obtained following a reduction of load on the host computing device Following reduction in the load on the host, the score can be increased based on the at least one remediation action.

17 Claims, 7 Drawing Sheets

(56) References Cited

U.S. PATENT DOCUMENTS

| | | | | |
|---|---|---|---|---|
| 2013/0007433 A1* | 1/2013 | Karandikar | G06F 21/575 | 713/2 |
| 2014/0164612 A1* | 6/2014 | Hillier | H04L 41/22 | 709/224 |
| 2015/0236896 A1* | 8/2015 | Brown | H04L 67/10 | 709/201 |
| 2015/0288709 A1* | 10/2015 | Singhal | H04L 63/102 | 726/23 |
| 2015/0378765 A1* | 12/2015 | Singh | G06F 9/45558 | 718/1 |
| 2016/0155128 A1* | 6/2016 | Desai | G06Q 20/4016 | 705/44 |
| 2016/0248805 A1* | 8/2016 | Burns | H04L 63/1433 | |
| 2017/0083525 A1* | 3/2017 | Guney | G06F 16/27 | |
| 2017/0279818 A1* | 9/2017 | Milazzo | H04L 63/1416 | |
| 2017/0308427 A1* | 10/2017 | Cheng | H04L 41/064 | |
| 2018/0046581 A1* | 2/2018 | Banerjee | G06F 11/079 | |
| 2018/0205593 A1* | 7/2018 | Livschitz | H04L 41/00 | |
| 2019/0026206 A1* | 1/2019 | Harutyunyan | G06F 11/0781 | |
| 2019/0102213 A1* | 4/2019 | Yousaf | G06F 11/30 | |

\* cited by examiner

DYNAMIC QUARANTINE OF IMPAIRED SERVERS

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines.

BRIEF DESCRIPTION OF DRAWINGS

Various embodiments in accordance with the present disclosure will be described with reference to the drawings, in which.

DETAILED DESCRIPTION

Figure 1:
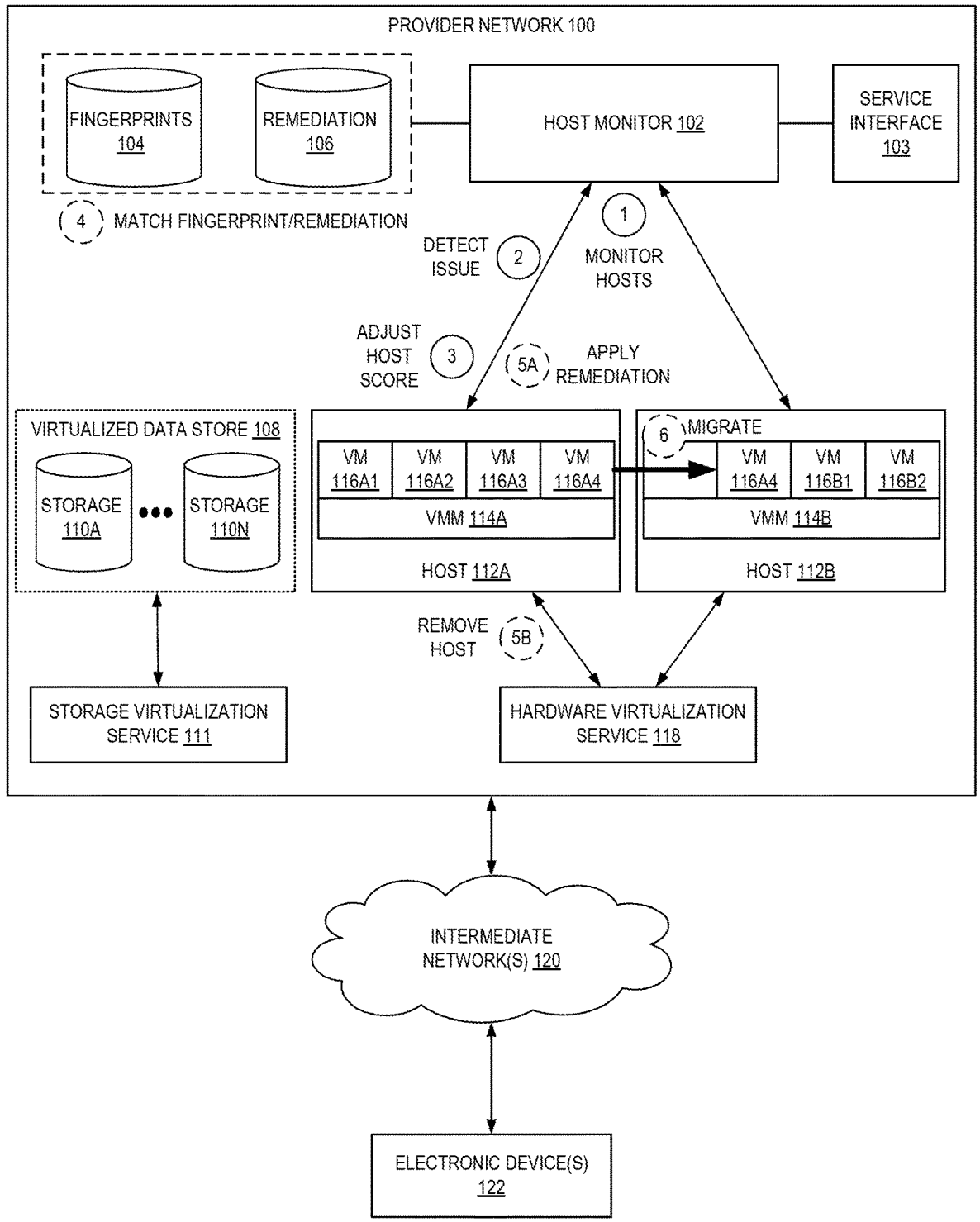
FIG. 1 is a diagram illustrating an environment for dynamic quarantine of impaired servers according to some embodiments.

Various embodiments of methods, apparatus, systems, and non-transitory computer-readable storage media for dynamic quarantine of impaired servers are described. According to some embodiments, a host score associated with the host computing device can be updated based at least on the at least one fingerprint, the score determining a probability of the host computing device being used for a new job. Second monitoring data associated with the host computing device can be obtained following a reduction of load on the host computing device Following reduction in the load on the host, the score can be increased based on the at least one remediation action.

As virtualization services have grown in scale of total virtual machines and varied customer workloads, issues (e.g., bugs) that were previously observed rarely, such as obscure kernel bugs, now manifest themselves more regularly. Generally, such bugs are manifested as a host impairment where the physical machine starts failing host-pings and other checks. These bugs are often transient and their impact on a given customer may vary depending on workload, from not significantly impacting the customer instances to causing a significant availability problem per customer. When these bugs manifest, it may not possible to detect if a particular instance triggered the bug and therefore per instance remediation cannot be readily performed.

Existing impairment systems can detect these events and remediation may include attempting to live migrate instances and marking the host "degraded," which results in taking it permanently out of the pool of available hosts and sending customer notifications, asking them to evict their instances. However, this solution is inappropriate for customers who are not impacted by the bug. Additionally, existing remediation techniques can result in degrading a large number of hosts for transient errors, resulting in customer impact and capacity shortages. However, ignoring these bugs assuming them to be transient is also not a viable solution.

Accordingly, various embodiments provide a dynamic quarantine-based mitigation and recovery system. Hosts may be monitored by a host monitor which obtains various data such as performance and diagnostic data. When a host has been determined to be experiencing conditions associated with an unknown bug, the host can be quarantined based on the detected conditions. For example, a variety of conditions may have associated fingerprints that are linked to one or more remedial actions. In some embodiments, machine learning techniques may be used to determine how long and how strictly to quarantine the host. The host can be removed from the placement pool or a host score associated with the host can be reduced based on the detected conditions (e.g., lowering the host's probability to having new instances allocated to it). This reduces the load on the host as at least some customer instances are self-migrated from the host. If reducing the load on the host does not lead to host recovery, a diagnostic instance may be run on the host to obtain more data from the host to potentially match the host's conditions to a known bug/remediation. If the host cannot be recovered within a set time, the host may be marked as being in a degraded state and running instances may be evicted. This may minimize customer impact, while still allowing users to self-migrate their instances that are impacted by a bug.

FIG. 1 is a diagram illustrating an environment for dynamic quarantine of impaired servers according to some embodiments. A provider network 100 provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage), network-related resources (e.g., configuring virtual networks including groups of compute resources, content delivery networks (CDNs), Domain Name Service (DNS)), application resources (e.g., databases, application build/deployment services), etc. These and other computing resources may be provided as services, such as a hardware virtualization service that can execute compute instances, a storage virtualization service that can store data objects, etc. The users (or "customers") of provider networks 100 may utilize one or more user accounts that are associated with a customer account, though these terms may be used somewhat interchangeably depend ending upon the context of use. Users may interact with a provider network 100 across one or more intermediate networks 120 (e.g., the internal via one or more interface(s), such as through use of application programming interface (API) calls, via a console implemented as a website or application, etc. The interface(s) 104 may be part of, or serve as a front-end to, a control plane of the provider network 100 that includes "backend" services supporting and enabling the services that may be more directly offered to customers. The users may access the provider network using one or more electronic devices 122 connected to the intermediate networks 120. The one or more electronic devices may include computing devices such as desktop, laptop, or mobile computing devices, servers, virtual machines, or other devices.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance hosted by the service provider system to perform a variety of computing tasks, or may indirectly utilize a compute instance by submitting code to be executed by the service provider system, which in turn utilizes a compute instance to execute the code (typically without the user having any control of or knowledge of the underlying compute instance(s) involved). Although embodiments are described herein with respect to virtual machines, embodiments may be used with systems having various compute resources.

Referring to FIG. 1, at least some networks in which embodiments may be implemented may include hardware virtualization technology that enables multiple operating systems to run concurrently on a host computer (e.g., hosts 112A and 112B), i.e. as virtual machines (VMs) 116 on the hosts 112. The VMs 116 may, for example, be executed on the hosts 112 that are rented or leased to customers of a network provider. A hypervisor, or virtual machine monitor (VMM) 114, on a host 112 presents the VMs 116 on the host with a virtual platform and monitors the execution of the VMs 116. Each VM 116 may be provided with one or more local IP addresses; the VMM 114 on a host 112 may be aware of the local IP addresses of the VMs 116 on the host. The provider network 100 may, for example, provide customers the ability to implement virtual computing systems (VMs 116) via a hardware virtualization service 118 and the ability to implement virtualized data stores 108 on storage resources 110 via a storage virtualization service 111.

As noted above, as hardware virtualization service 118 grows in scale, "bugs" (e.g., software errors at the kernel level) may be experienced more frequently. These bugs may impact multiple instances (e.g., virtual machines) on a host machine, and may lead to transient issues (e.g., slowdowns) or more serious errors requiring the host machine to be taken out of service for repairs.

A native approach to error handling could include marking the host unusable and transferring all customer instances off the host. However, this is an overcorrection for hosts that have transient errors. Additionally, customer instances that require more consistent performance can detect the error and choose to migrate their instances to a new host. Accordingly, embodiments utilize a host monitor 102 which can identify impairment conditions (and/or the operating conditions that lead to the impairment conditions) and apply one or more remedial actions to fix the error (and/or to proactively address the error). In addition to applying the one or more remedial action, the host may be placed in a "soft" quarantine (e.g., reduce a placement probability associated with the host such that new instances are not created on the host or are significantly less likely to be placed on the host). Currently executing instances may continue to execute while the host is in soft quarantine, and customer instances that experiencing performance degradation can be migrated by the customer without being placed on the quarantined machine.

As shown in FIG. 1, at numeral 1, host monitor 102 can monitor one or more hosts 112. For example, one or more host monitors may be configured to monitor hosts in a data center or may be configured to monitor hosts regionally in a distributed computing environment. In various embodiments, host monitor 102 can be implemented as an application executing on a host or VM within provider network 100. In some embodiments, host monitor 102 may communicate with hosts 112 over one or more wired or wireless connections. Host monitor 102 may directly or indirectly obtain performance and/or diagnostic data from the hosts 112 being monitored and may perform one or more checks on the hosts 112 (collectively "monitoring data"). For example, hosts 112 may collect and send performance data to the host monitor, host monitor 102 may instruct one or more diagnostic instances on the hosts to perform diagnostics and receive results, host monitor 102 may test communications with hosts 112, etc. Based on the monitoring data, at numeral 2, the host monitor may detect one or more issues with a host or hosts 112. In some embodiments, an issue is detected when the monitoring data is outside a defined range of values. For example, if packet loss exceeds a threshold value a packet loss issue may be detected. In some embodiments, an issue is detected due to a lack of data or a timeout. For example, a network connectivity issue may be determined where the host monitor does not receive a response from the host (e.g., in response to a ping), where the host monitor is unable to connect to a diagnostic instance on the host, where a virtualization service is unable to establish (or loses) a connection to the host, etc.

When an issue has been detected, as discussed above, a host score associated with the affected host can be adjusted as shown at numeral 3. A host score can be used to determine a placement probability for new instances being added to the host (e.g., to determine how likely a particular host is to receive new work from a user). In some embodiments, a host score may be a value between zero and one (or 1-100, 1-1000, A-Z, or any other defined value range) which may represent the placement probability. Adjusting the host score can include reducing the host score by a value determined based on the detected issue. For example, different issues may be associated with different values to reduce the host score (e.g., an issue may be looked up in a data structure to determine the corresponding value). In some embodiments, the host score may be reduced by a fixed amount regardless of the type of issue that was detected. Additionally, or alternatively the host score may be reduced based on the rate of issues being detected. For example, the appearance of issues may be tracked and each time the issue is detected the host score is reduced further by the value associated with the detected issue. In some embodiments, the value may be determined based on the number of times the issue has been detected (e.g., based on a non-linear function).

In some embodiments, host monitor 102 may receive input data from one or more services via service interface 103. For example, data may be received from a placement service responsible for launching or placing instances on hosts and used to increase or decrease the host score. The data received from other services may include event data such as attaching or detaching data store volumes, network input, successful/unsuccessful instance launches, etc. Additionally, if a host goes offline, or a mission critical service becomes unavailable, this may be detectable by other services (e.g., a cluster manager or communication manager may determine that the host is no longer contactable). Data indicating this issue may be communicated to the host monitor through service interface 203, which may then reduce the host's score. In some embodiments, weights may be assigned to the monitoring data to determine a value by which to reduce the host score. In some embodiments, the weights may be determined based on the prevalence of the issue identified in the monitoring data. For example, an issue that is detected on a large number of hosts may receive a low weight, reducing the amount by which the host score is reduced, while a rarely detected issue may receive a higher weight to increase the amount by which the host score is reduced.

In some embodiments, a host score may be adjusted based on a profile associated with the host. For example, a host's profile may indicate an expected uptime, downtime, workload, connection type, etc. and the host's score may be adjusted based on monitoring data that indicates that host is performing in an unexpected way. If a recently launched host associated with a profile that indicates it is a long lived host (e.g., a host that is not expected to terminate within a threshold amount of time of launch) is determined to have terminated and relaunched, the host score may be reduced by a value (e.g., predetermined based on the profile). In some embodiments, the host profile is provided by the customer or may be determined based on the performance history of the host or similar hosts.

In some embodiments, host monitor 102 may attempt to match the monitoring data to one or more fingerprints 104, as shown at numeral 4. For example, known impairments may be associated with fingerprints and remedial actions. In some embodiments, the fingerprints 104 may include one or more impairment conditions identified in the monitoring data. A hashing algorithm may be applied to these one or more impairment conditions to generate a hash value, which is then associated with a previously identified bug. In some embodiments, the hash value may also be associated with one or more remedial actions, which may be stored with fingerprints 104 or in a separate remediation data store 106. For example, a known kernel bug may cause a transient loss of network connectivity lasting a few seconds or minutes. If host monitor 102 detects a loss of connectivity in host 112A, the host monitor can hash the detected impairment condition (e.g., "loss of network connectivity") and use the resulting hash value to search fingerprints 104. Fingerprints 104 may be a lookup table or other indexed data structure allowing the hash value to be used to identify a matching fingerprint (if any). If there is a match, host monitor 102 may also identify one or more associated remedial action(s) to be applied, as shown at numeral 5A. For example, a patch may exist for a kernel bug causing the loss of network connectivity, and an associated remedial action may include applying (or installing) the patch to host 112A, remedying the issue or preventing future losses of connectivity. In some embodiments, if the problem persists despite the remediation, the host may optionally be removed from service as shown at numeral 5B and each instance may be migrated to one or more different hosts at numeral 6.

In some embodiments, when a bug is detected as described above, the host monitor updates the placement probability for the host. This may include lowering the probability of the host being selected for new work (e.g., to add new instances to for the same or new users). By reducing the placement probability, the load on the affected host is reduced and allows users affected by the issue to migrate their instances to another host, as shown at numeral 5. If the problem is still detected, the probability can be further reduced until new instances cannot be assigned to the host. In some embodiments, if the host is completely quarantined the customer can be sent a message to migrate their instances or the instances on the host may be migrated automatically and an alert can be pushed to the customer. If the problem is not detected again within a threshold amount of time, the probability can be increased by an amount associated with the fingerprint. This allows the host to be taken out of quarantine and returned to full service.

Figure 2:
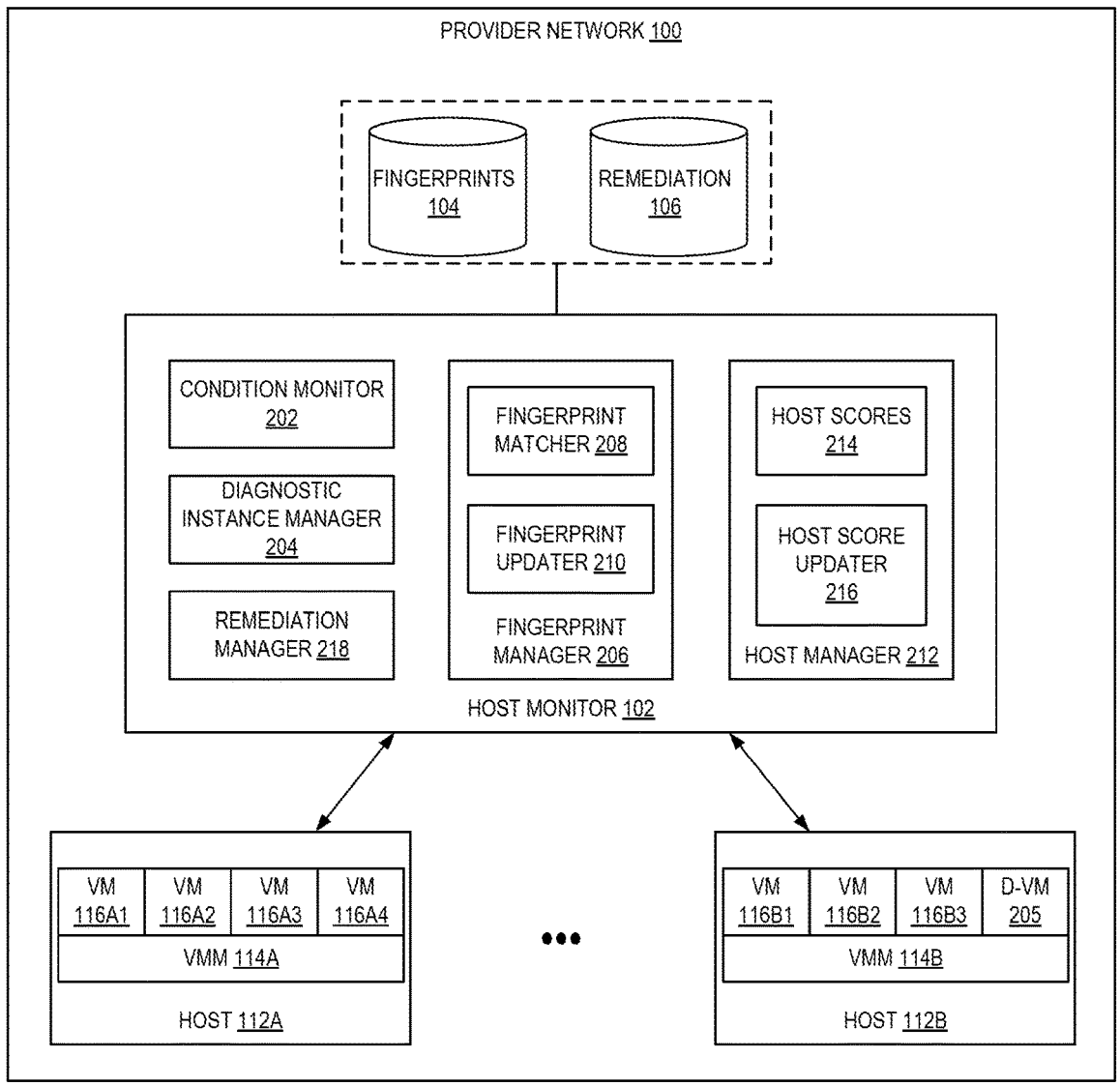
FIG. 2 is a diagram illustrating a host monitor according to some embodiments.

FIG. 2 is a diagram 200 illustrating a host monitor 102 according to some embodiments. As shown in FIG. 2, host monitor 102 can include a condition monitor 202 which obtains monitoring data from the monitored hosts. The condition monitor may receive lifecycle event data from the hosts (e.g., successful/unsuccessful VM launches, storage device mounting, increasing lags, uptime, etc.). In some embodiments, the condition monitor 202 can ping hosts to collect data related to response time, host reachability, or other communication data related to the host.

In some embodiments, diagnostic instance manager 204 can cause one or more diagnostic instances 205 to be allocated to the hosts 112. In some embodiments, diagnostic instances may collect performance data (e.g., memory utilization, network connection status, connection speed, heat level, etc.). The performance data may be returned to the condition monitor 202 via the diagnostic instance manager 204. In some embodiments, diagnostic instances 205 can perform one or more diagnostic tests on the hosts after a bug fix has been applied to the host. The diagnostic tests can be used to replicate operating conditions that are known to precede one or more bugs associated with the bug fix or the operating conditions that were observed prior to detection of an impairment condition.

Fingerprint manager 206 can receive the monitoring data from the condition monitor 202. Fingerprint matcher 208 can generate a hash value of the monitoring data using one or more hash functions (e.g., the family of secure hashing algorithms (SHAs), or other hashing algorithms) For example, a fingerprint may be:

$$fingerprint = H(\text{``condition 1''})$$

In the above example, H represents the hash function being used to generate the fingerprint, and condition 1 represents at least a portion of the monitoring data or a description/representation of the monitoring data. In some embodiments, each condition may represent monitoring data that indicates that the host is impaired (e.g., an impairment condition). For example, a loss of network connectivity, network speed below a threshold value, failed ping responses, lag time above a threshold value, etc. In some embodiments, multiple conditions may be hashed to generate a fingerprint (e.g., H("condition 1, condition 2, . . . condition N")). For example, a bug associated with a transient loss of network connectivity may have a hash value of H("loss of network connectivity"). Using the hash value, fingerprint matcher 208 can query fingerprints data store 104 to determine whether a matching fingerprint exists. In some embodiments, if a matching fingerprint does not exist, fingerprint updater 210 can add a matching fingerprint to fingerprint data store 104. Subsequently, when one or more remedial actions for the new fingerprint are identified, remediation data store 106 can be updated with the one or more remedial actions associated with the new fingerprint. In some embodiments, the detected conditions may be discrete, e.g., a loss of network connectivity, a reboot event, etc. In some embodiments, conditions may be identified over a time period to determine how many conditions, or what type of conditions, may be detected in that time period. Multiple detected conditions in a time period may lead to a different score change than a single detected condition. Likewise, the remedy associated with multiple detected conditions may be different from a single detected condition in the time period.

Host manager 212 can maintain host scores 214 for each host. The host score can be used to determine a placement probability for new instances being added (e.g., to determine how likely a particular host is to receive new work from a user). In some embodiments, a host score may be a value between zero and one (or 1-100, 1-1000, A-Z, or any other defined value range) which may represent the placement probability. When fingerprint matcher 208 matches monitoring data for a host to a fingerprint, fingerprint manager 206 can send a message to host manager 212 to update the host score based on the matched fingerprint. For example, host score updater 216 may identify a value associated with the fingerprint and reduce the host's score by that value. This reduces the chance that this host is used for another job, reducing the load placed on the host and enabling users to self-migrate off the host. In some embodiments, the value may be stored in fingerprint data store 104 and may be retrieved by host manager 212 by looking up the fingerprint hash value (e.g., using the fingerprint hash value as an index into the fingerprints data structure). As fingerprints for the same or different issues continue to be matched, the score may continue to be reduced, effecting a soft quarantine (e.g., probability reduced to the point no new jobs are being spun up on the host).

As discussed, reducing a host's score leads to a reduced load on that host. This can serve as its own remediation when an issue is identified (e.g., issues caused by the amount of load on the host may be remedied by the reduction in load). After a host's score has been reduced, the performance of that host may continue to be monitored by host monitor 102. In some embodiments, host score updater 216 can be configured to increase the host score based on monitoring data. For example, successful virtual machine launches may increase the score based on the number of successful launches in a period of time.

In some embodiments, when a fingerprint is associated with one or more remedial actions (stored in remediation data store 106), remediation manager 218 can apply the remedial actions to the host. For example, if a patch exists to fix a bug associated with the fingerprint, the remediation manager may cause the patch to be installed on the host (e.g., by pushing the patch to the host, instructing a hardware virtualization service to apply the patch, or other update technique). In some embodiments, after the remedial actions have been applied, diagnostic instance manager 204 may instruct diagnostic instance 205 to perform one or more diagnostic tests on the instance. For example, the diagnostic tests may recreate the operating conditions associated with the fingerprint to see if the bug is still detected. If the bug is no longer detected, the host score updater can raise the host score to reflect the bug has been fixed. The host score may be raised to a maximum value, returning the host to regular service. In some embodiments, the host score may increase over time according to a linear, exponential, or other function, to more gradually return the host to regular service.

In some embodiments, remedial actions may be associated with a host score instead of, or in addition to, being associated with fingerprints. For example, once a host score has been reduced, the score can be matched to a remedy in remediation data store 106. For example, if the host score reaches a minimum value, the remedy may be to remove the host from service and send it to be more thoroughly tested. If the score is reduced, but still above a minimum value, a remedy such as restarting the host may be triggered. This provides a level of abstraction between remedies and any specific underlying cause. Instead, the effect of that cause (e.g., the reduced score) may itself be used to trigger one or more remedial actions.

Figure 3:
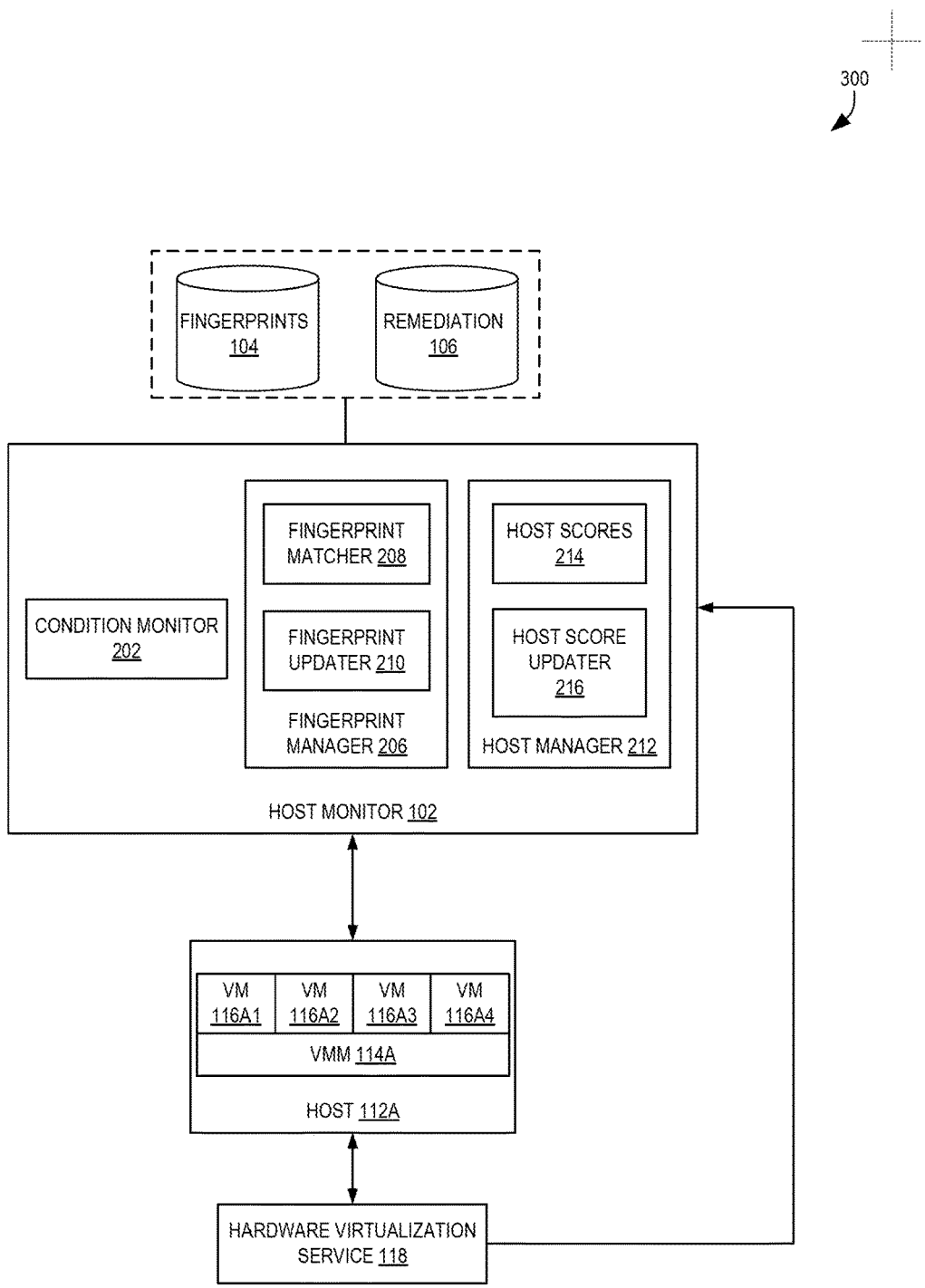
FIG. 3 is a diagram illustrating fingerprint matching and new fingerprint identification using feedback according to some embodiments.

FIG. 3 is a diagram 300 illustrating fingerprint matching and new fingerprint identification using feedback according to some embodiments. As discussed above, a host monitor 102 may monitor one or more hosts 112 including various virtual machine instances 116. Condition monitor 202 can collect various monitoring data from host and/or from hardware virtualization service 118. For example, the monitoring data may include event data, such as successful/unsuccessful virtual machine launches, drive mounting, uptime, etc., obtained from the host 112 directly or from hardware virtualization service 118. As discussed, the monitoring data may also include performance data (e.g., host memory utilization, network connection status, disk fragmentation, heat production, or other data) and/or diagnostic data received from one or more diagnostic instances executing on the host.

As discussed above, a condition monitor 202 can generate a hash value of all or a portion of the monitoring data. Fingerprint manager 206 can generate fingerprints based on monitoring data and match the generated fingerprints to fingerprints stored in fingerprint data store 104. This hash value can be matched to known bugs by fingerprint matcher 208. A host score manager 212 can maintain a host score 214 for each monitored host. The host score can be reduced by host score updater 216 by an amount based on the fingerprint. For example, each fingerprint in fingerprint data store 104 may be linked to a host score reduction value. As fingerprints for the same or different issues continue to be matched for a host, the score for that host may continue to be reduced, effecting a soft quarantine when the host approaches its lowest value (e.g., probability reduced to the point no new jobs are being spun up on the host) on the host. This allows host monitor 102 to identify a bug when it occurs based on, e.g., the reduced performance associated with the bug.

This is useful in applying a remediation to a known bug when the effects of the bug are detected. In some embodiments, condition monitor 304 can collect monitoring data over a longer time period to collect monitoring data that precedes the one or more impairment conditions of the host associated with a known bug. For example, one or more operating conditions may regularly occur before a given bug affects the performance of the host such that the host is impaired. Fingerprint updater 210 can identify operating conditions from the monitoring data that occur prior to the appearance of the impairment condition or conditions associated with the bug. These preceding operating conditions can be added to the existing fingerprint by fingerprint updater 210. For example, an expanded fingerprint may be fingerprint=H("condition A, condition 1"), where condition A represents the one or more preceding operating conditions and condition 1 represents the one or more impairment conditions associated with the bug. In some embodiments, fingerprint updater 210 can create a new fingerprint for the preceding conditions which is also associated with the same bug.

In some embodiments, the expanded fingerprints can be associated with remediation actions stored in remediation data store 106. When the expanded fingerprint is identified using the monitoring data, the corresponding remedial actions can be performed before the corresponding bug manifests itself in the monitoring data. In some embodiments, feedback the application of the remedy can be used to refine the expanded fingerprint. For example, if the bug continues to manifest, the preceding operating conditions of the expanded fingerprint may not be associated with the bug, and the expanded fingerprint can be removed from fingerprint data store 104. If the bug no longer manifests after the remedial action associated with the expanded fingerprint, the expanded fingerprint can be confirmed and used to proactively fix the bug before it manifests.

Figure 4:
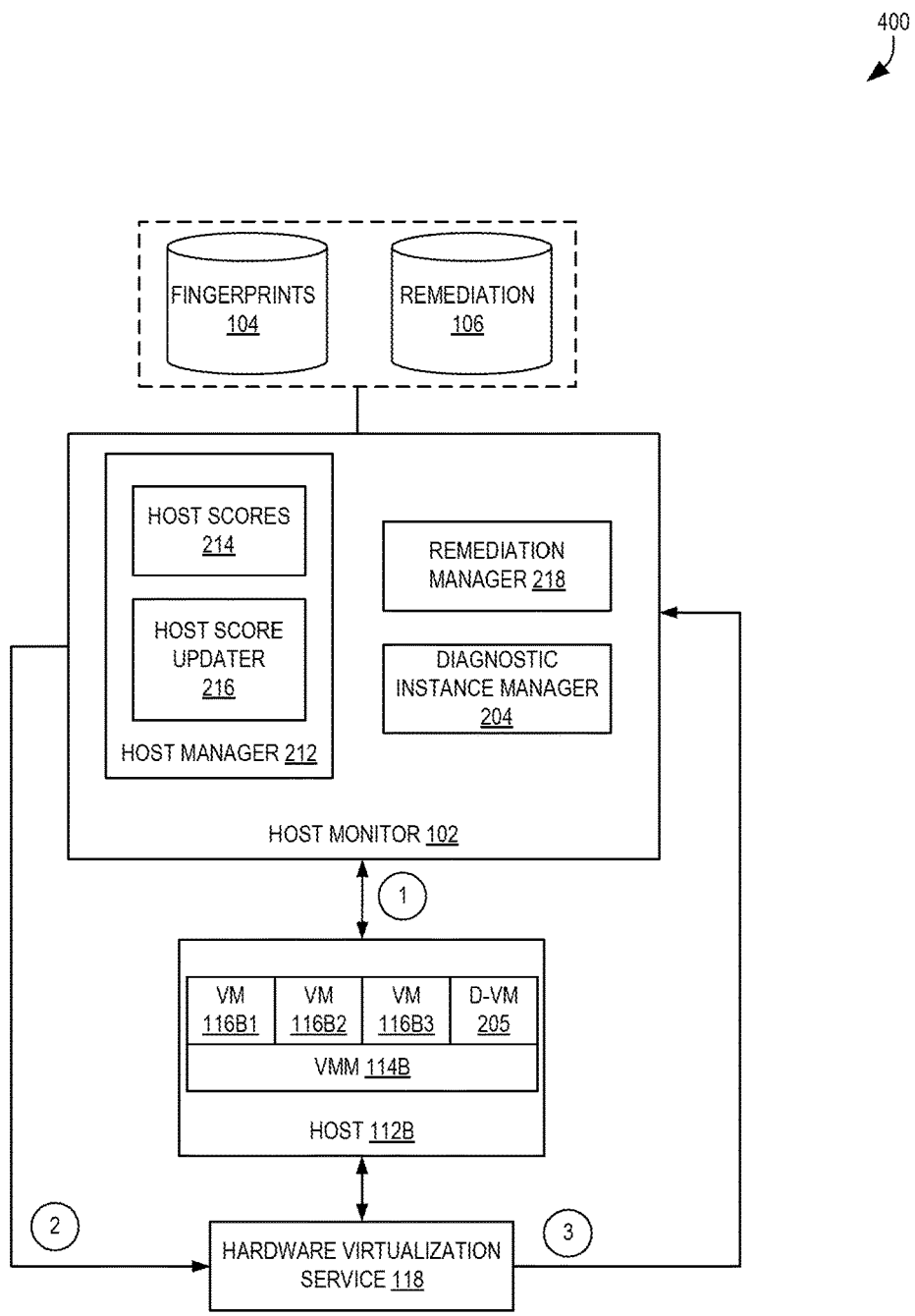
FIG. 4 is a diagram illustrating application of remedial actions and remediation feedback according to some embodiments.

FIG. 4 is a diagram 400 illustrating application of remedial actions and remediation feedback according to some embodiments. As discussed, each fingerprint in fingerprint data store 104 may be associated with one or more remedial actions stored in remediation data store 106. Remediation manager 218 can instruct host 112B directly (as shown at numeral 1) or via hardware virtualization service 118 (as shown at numeral 2) to perform one or more remediation actions. In various embodiments, host manager 212 can manage host scores 214. The host scores 214 may correspond to a probability that a corresponding host will receive a new job from a user (e.g., that the host will be selected by a placement system to have a new instance allocated for the user). If remediation is successful, host score updater 216 can positively change the score (e.g., maximize the score to return the host to full service, reset the score to a value specified by the remediation performed, increase the score by a value specified by the remediation performed, etc.).

In some embodiments, diagnostic instances 205 may be used to determine if the remediation is successful. Diagnostic instances may be allocated to the host as part of the remedial actions and may execute on the host along with various user instances 116B. Diagnostic instance 205 can perform tests on the host, such as repeating the operating conditions in the fingerprint that led to the bug being detected. In some embodiments, diagnostic tests may also be used to increase the host score (e.g. with each test, the score goes up by a set amount, a weighted amount, according to a linear or exponential function, etc.). Diagnostic feedback may be received by host monitor 102 directly (as shown at numeral 1) or through hardware virtualization service 118 (as shown at numeral at 3). Diagnostic instances, such as diagnostic instance 205, can test specific conditions, collect additional information by the instance. The diagnostics performed may vary depending on the number of customer instances currently running on the host. For example, if no customer instances are running on the host, the diagnostics may be performance focused, such as causing high memory or processor utilization. However, to avoid negatively impacting the performance of the host when active customer instances are operating, the diagnostic instance may replicate operating conditions that preceded detection of the bug while monitoring the host to determine if the bug is still triggered. If the diagnostics tests fail (e.g., indicating that the bug has not been fixed by the remedial action), then host score updater 216 can reduce the corresponding host score 214. In some embodiments, if a remedy is not identified within a set time period, host monitor 102 may take host 112B out of service and evict all running jobs/virtual machines 116B.

If the diagnostic tests pass, then the host may be returned to service. For example, the corresponding host score can be maximized, making the host the most likely to receive new jobs as they are allocated. In some embodiments, the host can be returned to service gradually. For example, every successful virtual machine launch may increase the host's score (e.g., linearly, exponentially, or according to another function). In some embodiments, each fingerprint and/or remediation may be associated with reintegration data that defines how the host is to be reintegrated once the corresponding bug has been fixed. In some embodiments, remediation feedback received from host 112 and/or hardware virtualization service 118 can be used to change the reintegration data. For example, if a particular remedial action (e.g., installing a patch) is successfully used to fix a bug across multiple hosts, the reintegration data associated with the remedial action can be changed from a gradual return to service, to resetting the host score to its maximum value, returning the host to full service immediately after applying the remedial action.

In some embodiments, if the remediation triggers signals to other systems (e.g., autorecovery, migration, etc.) a message may be sent to a user presenting several possible remediation options. The host monitor may receive a response including the user's selected remediation actions.

Figure 5:
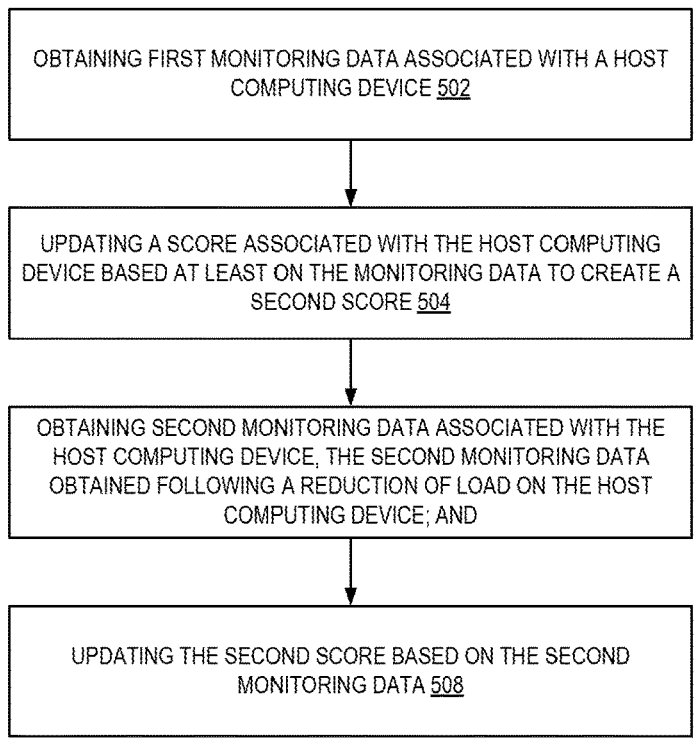
FIG. 5 is a flow diagram illustrating operations for dynamic quarantine of impaired servers according to some embodiments.

FIG. 5 is a flow diagram illustrating operations 500 for dynamic quarantine of impaired servers according to some embodiments. Some or all of the operations 500 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 500 are performed by the host monitor of the other figures.

The operations 500 include, at block 502, obtaining monitoring data associated with a host computing device to at least one fingerprint. A host monitor can obtain the monitoring data (which may include performance data, diagnostic data, lifecycle events, etc.) for the host computing device. The monitoring data may be obtained from at least one of the host computing device or a virtualization service. For example, obtaining the monitoring data may include the host monitor requesting at least a portion of the monitoring data from the host computing device or a virtualization service, and receiving it in response to the request. In some embodiments, obtaining the monitoring data may include receiving data from a diagnostic instance on the host computing device as the diagnostic instance completes one or more diagnostic checks. In some embodiments, the monitoring data may be matched to a fingerprint. Matching may include the host monitor calculating a hash value based at least on at least one impairment condition in the monitoring data and matching the hash value to the at least one fingerprint. For example, the calculated hash value may be used to query a fingerprint data store.

At block 504, the host monitor can update a score associated with the host computing device based at least on the monitoring data to create a second score, the score determining a probability of the host computing device being used for a new job. As indicated above, the host monitor can manage a score for each host computing device it is monitoring. Each host score may be a value within a predetermined range of values (e.g., 0-1, 0-100, or any other range), and may represent the probability that a new job (e.g., new customer instance) will be placed on the host. When a fingerprint is matched by the host monitor, a score reduction value associated with the matched fingerprint can be determined by the host monitor. The host reduction score may be included in and linked to an entry for the matched fingerprint in a fingerprint data store. In some embodiments, updating the score associated with the host computing device may include reducing the score by the score reduction value. By reducing the score of a host, new jobs become less likely to be placed on the host. For example, if the second score is a minimum score (e.g., at the low end of the predetermined range of values), then the host computing device can be removed from a placement pool such that new jobs cannot be added to the host. As pending jobs on the host complete, and users self-migrate from the affected host, the load on the host is reduced. If the bug is transient, the host may recover without additional action by the host monitor and the host can be returned to service.

At block 506, the host monitor can obtain second monitoring data associated with the host computing device. The second monitoring data can be obtained following a reduction of load on the host computing device. As discussed, by reducing the host score, new instances are less likely to be placed on the host computing device, additionally users may self-migrate from the host computing device, reducing the load on the host computing device.

In some embodiments, the host monitor can cause at least one remediation action associated with the fingerprint to be performed on the host computing device. In some embodiments, the at least one remediation may be identified in a remediation data store indexed by the fingerprint. In some embodiments, the at least one remediation action can be stored with fingerprints in the fingerprint data store. For example, the host monitor can query a fingerprint data store using the fingerprint to determine at least one remediation action and a host score reduction value associated with the fingerprint. Once the at least one remediation action has been identified, the host monitor can cause the at least one remediation action associated with the fingerprint to be performed on the host computing device. In various embodiments, a remediation action can include installing a software patch or other update on the host computing device to fix the underling bug. For example, a kernel update may be pushed to a host computing device to correct a kernel bug.

In some embodiments, to determine whether the remediation action has succeeded, the host monitor can request at least one diagnostic instance be allocated to the host computing device, and cause the diagnostic instance to perform at least one diagnostic check to determine whether the at least one remediation action succeeded. In some embodiments, diagnostic instances may include virtual machines that can be allocated to the host computing devices and execute with customer instances on the host computing devices. The diagnostic instances may collect performance data (e.g., memory utilization, network connection status, connection speed, heat level, etc.), and can perform one or more diagnostic tests on the hosts after a bug fix has been applied to the host. The diagnostic tests can be used to replicate operating conditions that are known to precede one or more bugs associated with the bug fix or the operating conditions that were observed prior to detection of an impairment condition. If the impairment condition is no longer detected or triggered, the remediation action is successful and the host computing device can be returned to service. If the impairment condition is still detected or triggered, the host monitor can determine, based on the at least one diagnostic instance that the at least one remediation failed, evict any instances from the host computing device, and mark the host computing device degraded. The host may then be taken out of service.

At block 508, the host monitor can update the second score based on the second monitoring data. In some embodiments, updating the second score may include increasing the host score to return the host computing device to service, wherein increasing the host score increases the probability of the host computing device being used for the new job. In some embodiments, the second monitoring data may include lifecycle events, such as successful instance launches, drive mountings, etc. Based on the second monitoring data the score may be increased. In some embodiments, at least one remediation action can be applied to the host computing device. The at least one remediation action is associated with a score reset value. The host monitor can update the second score by setting the second score to the reset value. This may return the host computing device to service by maximizing the host score, making it the most likely to receive a new job. In some embodiments, the at least one remediation action is associated with a reintegration function to increase the score. The host monitor can update the second score by increasing the score using the reintegration function. For example, the reintegration function may be a linear, exponential, or other function that increases the host score over time, enabling the host computing device to be gradually reintroduced into service.

In some embodiments, the host monitor can determine at least one condition preceding the at least one impairment condition, generate a second fingerprint using the at least one condition, and associate the second fingerprint with the at least one remediation action. By generating a fingerprint for the operating conditions preceding the impairment condition, bug fixes may be applied proactively, before the impairment condition is detected. For example, the host monitor can obtain at least one of performance data or diagnostic data for a second host computing device from at least one of the second host computing device or the virtualization service. The host monitor can detect in the at least one of the performance data or diagnostic data for the second host computing device, the at least one condition preceding the at least one impairment condition caused by the kernel bug. The host monitor can then cause the at least one remediation action associated with the second fingerprint to be performed on the host computing device prior to detection of the at least one impairment condition.

Figure 6:
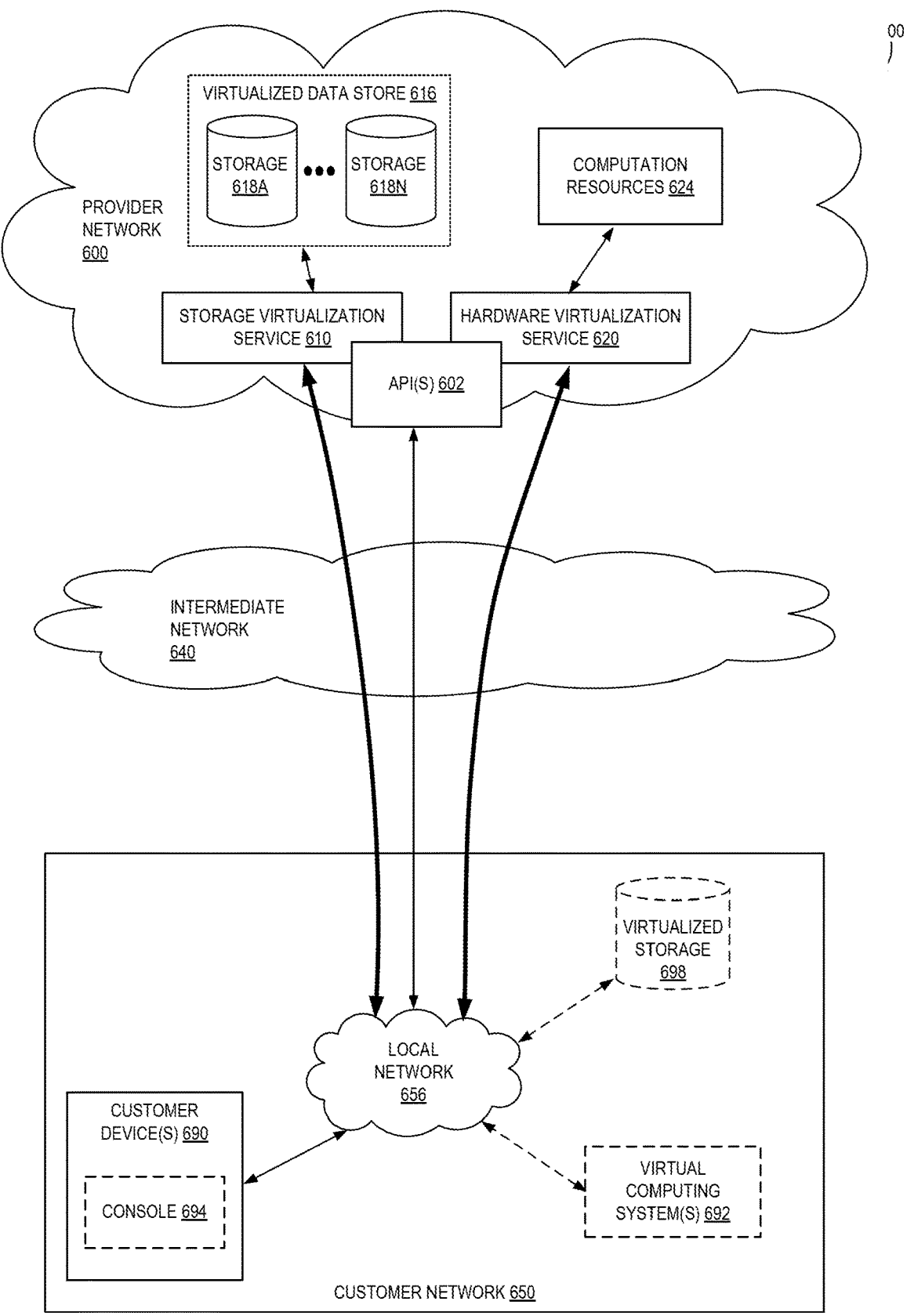
FIG. 6 is a block diagram of an example provider network that provides a storage virtualization service and a hardware virtualization service to customers according to some embodiments.

FIG. 6 is a block diagram of an example provider network that provides a storage virtualization service and a hardware virtualization service to customers, according to some embodiments. Hardware virtualization service 620 provides multiple computation resources 624 (e.g., VMs) to customers. The computation resources 624 may, for example, be rented or leased to customers of the provider network 600 (e.g., to a customer that implements customer network 650). Each computation resource 624 may be provided with one or more local IP addresses. Provider network 600 may be configured to route packets from the local IP addresses of the computation resources 624 to public Internet destinations, and from public Internet sources to the local IP addresses of computation resources 624.

Provider network 600 may provide a customer network 650, for example coupled to intermediate network 640 via local network 656, the ability to implement virtual computing systems 692 via hardware virtualization service 620 coupled to intermediate network 640 and to provider network 600. In some embodiments, hardware virtualization service 620 may provide one or more APIs 602, for example a web services interface, via which a customer network 650 may access functionality provided by the hardware virtualization service 620, for example via a console 694 (e.g., a web-based application, standalone application, mobile application, etc.). In some embodiments, at the provider network 600, each virtual computing system 692 at customer network 650 may correspond to a computation resource 624 that is leased, rented, or otherwise provided to customer network 650.

From an instance of a virtual computing system 692 and/or another customer device 690 (e.g., via console 694), the customer may access the functionality of storage virtualization service 610, for example via one or more APIs 602, to access data from and store data to storage resources 618A-618N of a virtual data store 616 provided by the provider network 600. In some embodiments, a virtualized data store gateway (not shown) may be provided at the customer network 650 that may locally cache at least some data, for example frequently accessed or critical data, and that may communicate with virtualized data store service 610 via one or more communications channels to upload new or modified data from a local cache so that the primary store of data (virtualized data store 616) is maintained. In some embodiments, a user, via a virtual computing system 692 and/or on another customer device 690, may mount and access virtual data store 616 volumes, which appear to the user as local virtualized storage 698.

While not shown in FIG. 6, the virtualization service(s) may also be accessed from resource instances within the provider network 600 via API(s) 602. For example, a customer, appliance service provider, or other entity may access a virtualization service from within a respective virtual network on the provider network 600 via an API 602 to request allocation of one or more resource instances within the virtual network or within another virtual network.

Figure 7:
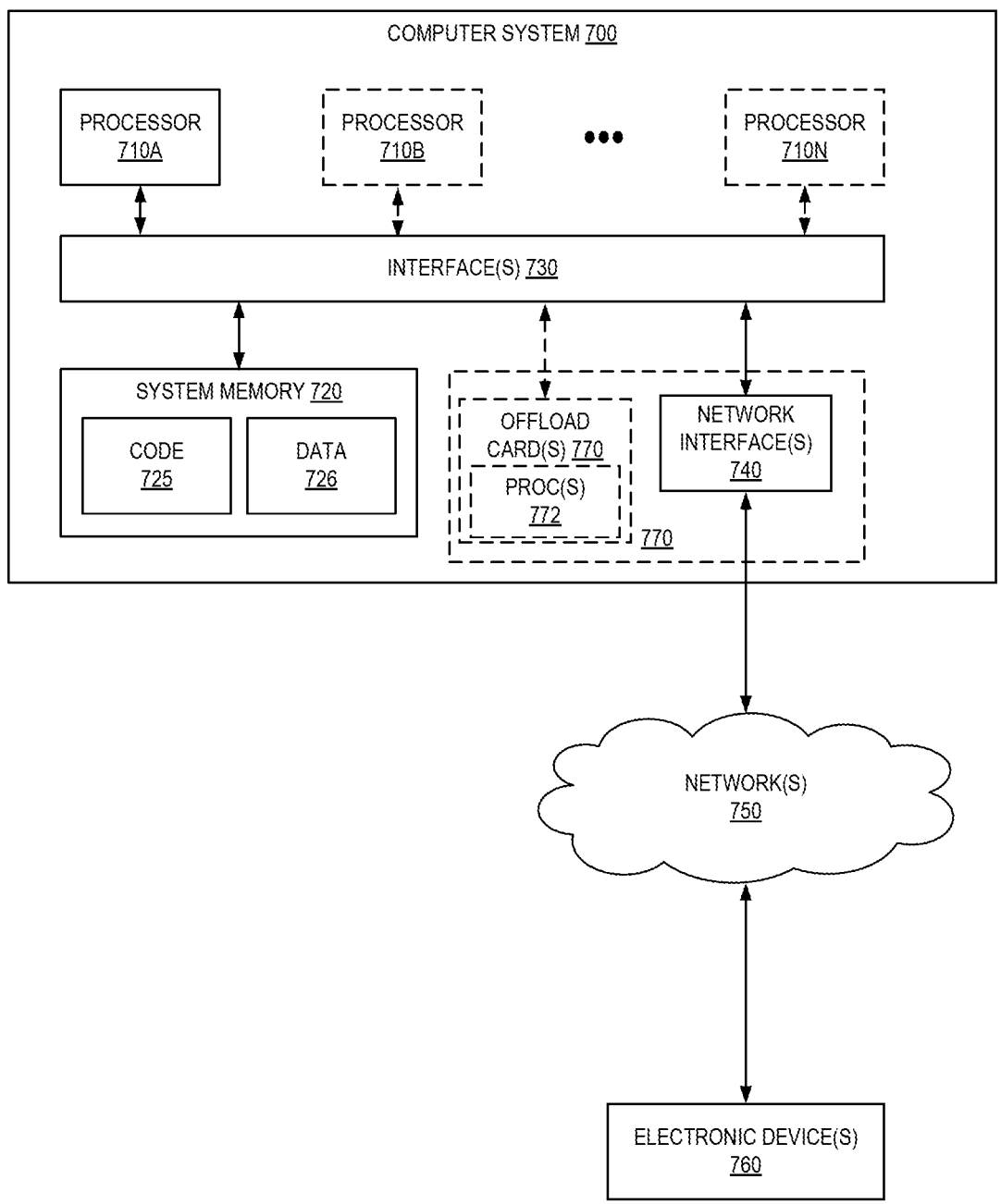
FIG. 7 is a block diagram illustrating an example computer system that may be used in some embodiments.

In some embodiments, a system that implements a portion or all of the techniques for dynamic quarantining of impaired servers as described herein may include a general-purpose computer system that includes or is configured to access one or more computer-accessible media, such as computer system 700 illustrated in FIG. 7. In the illustrated embodiment, computer system 700 includes one or more processors 710 coupled to a system memory 720 via an input/output (I/O) interface 730. Computer system 700 further includes a network interface 740 coupled to I/O interface 730. While FIG. 7 shows computer system 700 as a single computing device, in various embodiments a computer system 700 may include one computing device or any number of computing devices configured to work together as a single computer system 700.

In various embodiments, computer system 700 may be a uniprocessor system including one processor 710, or a multiprocessor system including several processors 710 (e.g., two, four, eight, or another suitable number). Processors 710 may be any suitable processors capable of executing instructions. For example, in various embodiments, processors 710 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 710 may commonly, but not necessarily, implement the same ISA.

System memory 720 may store instructions and data accessible by processor(s) 710. In various embodiments, system memory 720 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for resizing virtual networks in provider network environments, are shown stored within system memory 720 as code 725 and data 726.

In one embodiment, I/O interface 730 may be configured to coordinate I/O traffic between processor 710, system memory 720, and any peripheral devices in the device, including network interface 740 or other peripheral interfaces. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 720, may be incorporated directly into processor 710.

Network interface 740 may be configured to allow data to be exchanged between computer system 700 and other devices 760 attached to a network or networks 750, such as other computer systems or devices as illustrated in FIG. 1, for example. In various embodiments, network interface 740 may support communication via any suitable wired or wireless general data networks, such as types of Ethernet network, for example. Additionally, network interface 740 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 700 includes one or more offload cards 770 (including one or more processors 775, and possibly including the one or more network interfaces 740) that are connected using an I/O interface 730 (e.g., a bus implementing a version of the Peripheral Component Interconnect—Express (PCI-E) standard, or another interconnect such as a QuickPath interconnect (QPI) or UltraPath interconnect (UPI)). For example, in some embodiments the computer system 700 may act as a host electronic device (e.g., operating as part of a hardware virtualization service) that hosts compute instances, and the one or more offload cards 770 execute a virtualization manager that can manage compute instances that execute on the host electronic device. As an example, in some embodiments the offload card(s) 770 can perform compute instance management operations such as pausing and/or un-pausing compute instances, launching and/or terminating compute instances, performing memory transfer/copying operations, etc. These management operations may, in some embodiments, be performed by the offload card(s) 770 in coordination with a hypervisor (e.g., upon a request from a hypervisor) that is executed by the other processors 710A-710N of the computer system 700. However, in some embodiments the virtualization manager implemented by the offload card(s) 770 can accommodate requests from other entities, and may not coordinate with (or service) any hypervisor.

In some embodiments, system memory 720 may be one embodiment of a computer-accessible medium configured to store program instructions and data as described above for FIG. 1 for dynamic quarantining of impaired servers. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 700 via I/O interface 730. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 700 as system memory 720 or another type of memory. Further, a computer-accessible medium may include transmission media or signals such as electrical, electromagnetic, or digital signals, conveyed via a communication medium such as a network and/or a wireless link, such as may be implemented via network interface 740.

Various embodiments may further include receiving, sending, or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

Various embodiments may further include receiving, sending, or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 112A-112B, 116A1-116A4, etc.) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
obtaining first monitoring data associated with a host computing device, the first monitoring data indicating a load on the host computing device;
updating a first score associated with the host computing device based at least on the first monitoring data to be a second score, the second score reducing a probability of the host computing device being used to host a new customer instance;
calculating a hash value based at least on at least one impairment condition in the first monitoring data;
matching the hash value to at least one fingerprint;
causing at least one remediation action associated with the at least one fingerprint to be performed on the host computing device;
updating the second score based on the at least one remediation action to create a third score, wherein the at least one remediation action is associated with a score reset value, and wherein updating the second score based on the at least one remediation action includes updating the second score to be the score reset value to yield the third score;

obtaining second monitoring data associated with the host computing device, the second monitoring data obtained following a reduction of the load on the host computing device; and updating the third score based on the second monitoring data to create a fourth score, the fourth score increasing the probability of the host computing device being used to host a new customer instance.

2. The computer-implemented method of claim 1 wherein the third second score is a minimum score, and wherein the method further comprises removing the host computing device from a placement pool.

3. The computer-implemented method of claim 1 further comprising:

requesting at least one diagnostic instance be allocated to the host computing device; and causing the diagnostic instance to perform at least one diagnostic check to determine whether the at least one remediation action succeeded.

4. The computer-implemented method of claim 3 further comprising:

determining, based on the at least one diagnostic instance that the at least one remediation failed;

evicting any instances from the host computing device; and marking the host computing device as degraded.

5. A computer-implemented method comprising:

obtaining first monitoring data associated with a host computing device, the first monitoring data indicating a load on the host computing device;

updating a first score associated with the host computing device based at least on the first monitoring data to create a second score, the second score reducing a probability of the host computing device being used to host a new customer instance;

calculating a hash value based at least on at least one impairment condition in the first monitoring data;

matching the hash value to at least one fingerprint, wherein the at least one fingerprint is associated with a score reduction value, wherein updating the first score associated with the host computing device comprises reducing the first score by the score reduction value to yield the second score;

obtaining second monitoring data associated with the host computing device, the second monitoring data obtained following a reduction of the load on the host computing device; and updating the second score based on the second monitoring data to create a third score, the third score increasing the probability of the host computing device being used to host a new customer instance.

6. The computer-implemented method of claim 5, further comprising:

causing at least one remediation action associated with the at least one fingerprint to be performed on the host computing device; and updating the second score based on the at least one remediation action to yield the third score.

7. The computer-implemented method of claim 6 wherein the at least one remediation action is associated with a score reset value and wherein updating the second score based on the at least one remediation action includes setting the second score to the score reset value to yield the third score.

8. The computer-implemented method of claim 6 wherein the at least one remediation action is associated with a reintegration function and wherein updating the second score based on the at least one remediation action includes increasing the second score using the reintegration function to yield the third score.

9. The computer-implemented method of claim 5 wherein the second score is a minimum score, and wherein the method further comprises removing the host computing device from a placement pool.

10. The computer-implemented method of claim 6 further comprising:

requesting at least one diagnostic instance be allocated to the host computing device; and causing the diagnostic instance to perform at least one diagnostic check to determine whether the at least one remediation action succeeded.

11. The computer-implemented method of claim 10 further comprising:

determining, based on the at least one diagnostic instance, that the at least one remediation action failed;

evicting any instances from the host computing device; and marking the host computing device as degraded.

12. A computer-implemented method comprising:

obtaining first monitoring data associated with a host computing device, the first monitoring data indicating a load on the host computing device;

updating a first score associated with the host computing device based at least on the first monitoring data to create a second score, the second score reducing a probability of the host computing device being used to host a new customer instance;

requesting at least one diagnostic instance be allocated to the host computing device;

causing the diagnostic instance to perform at least one diagnostic check to determine whether at least one remediation action succeeded;

determining, based on the at least one diagnostic instance, that the at least one remediation action failed;

evicting any instances from the host computing device;

marking the host computing device as degraded;

obtaining second monitoring data associated with the host computing device, the second monitoring data obtained following a reduction of the load on the host computing device; and updating the second score based on the second monitoring data to create a third score, the third score increasing the probability of the host computing device being used to host a new customer instance.

13. The computer-implemented method of claim 12, further comprising:

calculating a hash value based at least on at least one impairment condition in the first monitoring data; and matching the hash value to at least one fingerprint.

14. The computer-implemented method of claim 13, further comprising:

causing at least one remediation action associated with the at least one fingerprint to be performed on the host computing device; and updating the second score based on the at least one remediation action.

15. The computer-implemented method of claim 14 wherein the at least one remediation action is associated with a score reset value, and wherein updating the second score based on the at least one remediation action includes updating the second score to the score reset value.

16. The computer-implemented method of claim 13 wherein the at least one fingerprint is associated with a score reduction value, and wherein updating the first score associated with the host computing device comprises reducing the first score by the score reduction value to yield the second score.

17. The computer-implemented method of claim 16 wherein the second score is a minimum score, and wherein the method further comprises removing the host computing device from a placement pool.

* * * * *